March 30, 1926.
E. D. STEARNS
STORAGE BIN
Filed Jan. 10, 1925  2 Sheets-Sheet 1
1,578,690
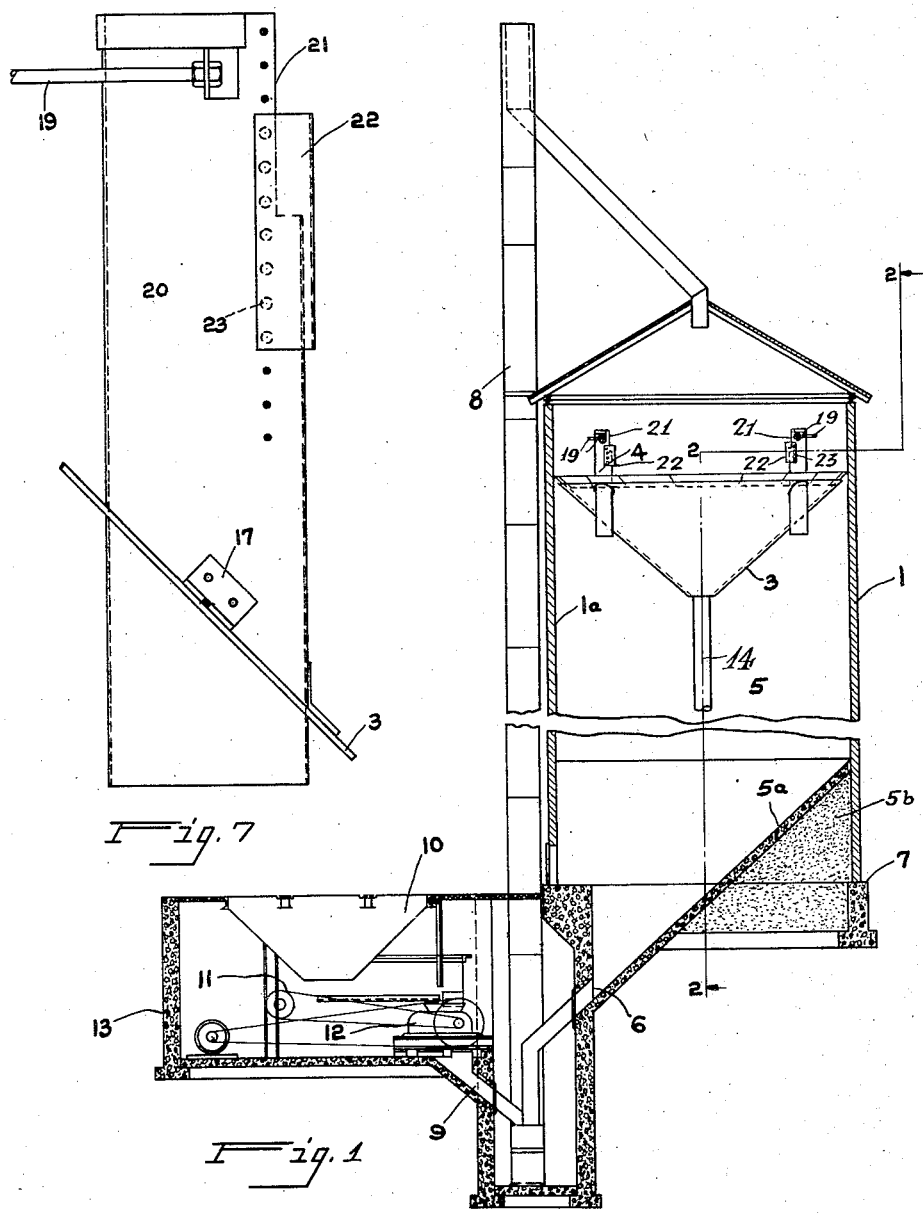
INVENTOR
Earl D. Stearns
BY
Richey Slough & Watts
ATTORNEYS

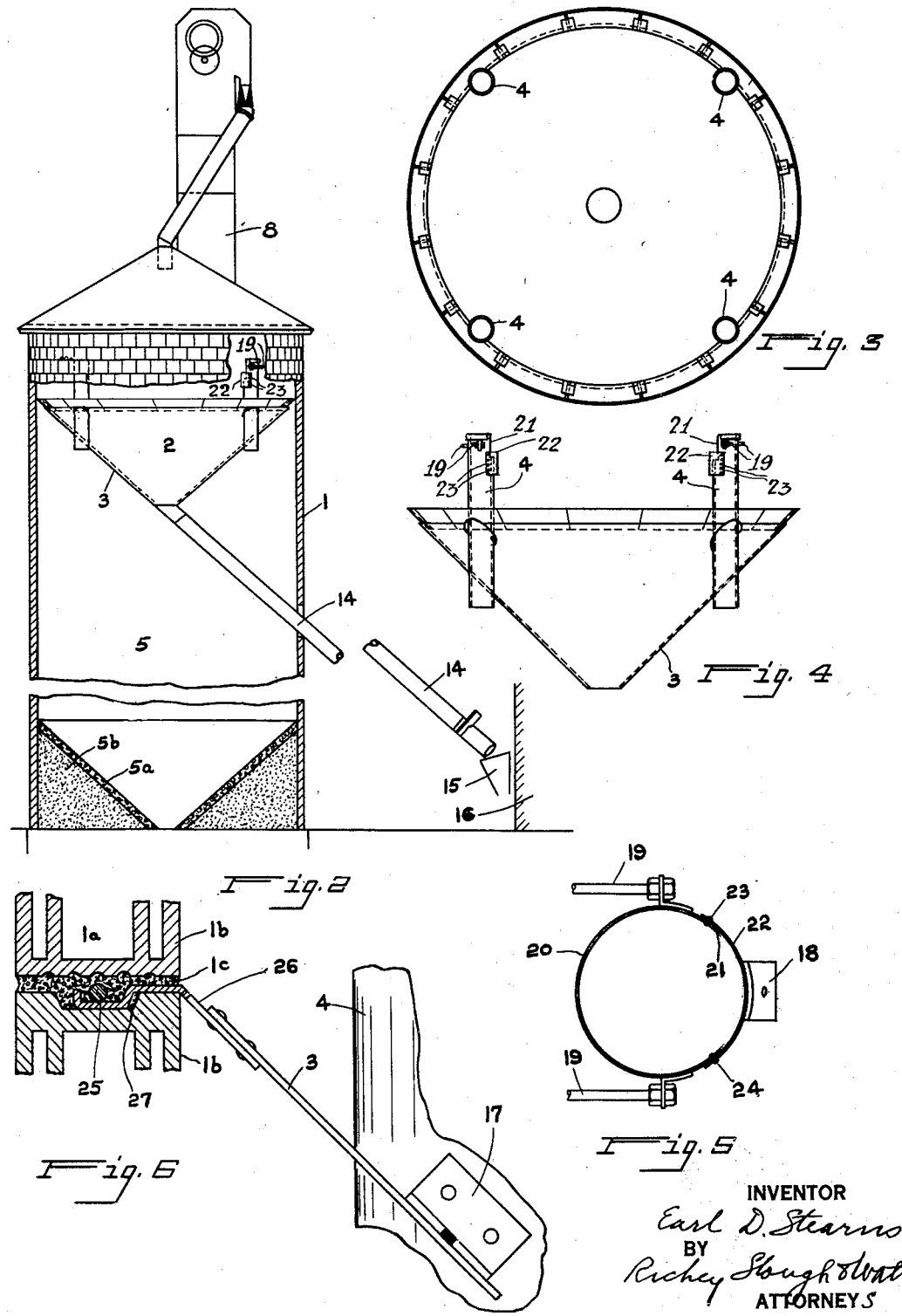

Patented Mar. 30, 1926.                                                                1,578,690

UNITED STATES PATENT OFFICE.

EARL D. STEARNS, OF CLEVELAND, OHIO, ASSIGNOR TO THE STEARNS CONVEYOR COMPANY, OF CLEVELAND, OHIO, A CORPORATION OF OHIO.

STORAGE BIN.

Application filed January 10, 1925. Serial No. 1,525.

*To all whom it may concern:*

Be it known that I, EARL D. STEARNS, a citizen of the United States, residing at Cleveland, in the county of Cuyahoga and State of Ohio, have invented certain new and useful Improvements in Storage Bins, of which the following is a specification.

This invention relates to a storage bin or "silo" of the type having live and dead storage compartments.

One object of the invention is to construct a storage silo provided with a conically shaped, live storage hopper bottom which may be peripherally supported therein.

Another object is to construct a storage silo provided with a conically shaped hopper bottom having overflow openings through which material may be controllably discharged.

Another object is to construct a storage silo having upright, circular walls comprised of concrete or similar material and a metallic conically shaped hopper bottom supported by the upper part of the walls.

Other objects will appear and be pointed out hereinafter.

In the drawings attached to and forming a part of this specification:

Fig. 1 is a sectional view through a silo or storage bin and its associated parts constructed in accordance with my invention;

Fig. 2 is an elevational view, partly in section, taken substantially on line 2—2 of Fig. 1;

Figs. 3 and 4 are respectively top plan and side elevational views of the bottom wall of the live storage hopper;

Fig. 5 is a top plan view of one form of overflow spout;

Fig. 6 is a detail view showing one means for securing the bottom wall of the live storage hopper to the upright wall of the bin, and Fig. 7 is an enlarged fragmentary view of some of the apparatus shown in Figs. 1, 2 and 4, but showing an adjustable overflow spout with the silo wall and other parts broken away.

The numeral 1ª indicates the upright walls of a cylindrical storage bin or "silo" having a live storage hopper 2 disposed in the upper part thereof and formed by a conically shaped bottom wall 3 spanning the space between the upright walls of the silo 1, and secured thereto. The hopper wall 3 is preferably provided with openings 4 through which excess material may overflow and be discharged from the live storage hopper into the dead storage hopper 5 within the silo 1 and below the hopper 2. Preferably spouts 4 are formed about such overflow openings to increase and regulate the capacity as will presently be pointed out hereinafter. I preferably form the bottom wall 5ª of the dead storage hopper 5 adjacent to the ground level of the silo and so slope the wall that material resting thereon may discharge itself through a passage 6 at or below the floor level, which is indicated at 7, into the conveyor 8. This wall 5ª may, if desired, be composed of concrete supported by cinders 5ᵇ or other suitable material.

Associated with the silo is an upright conveyor 8 for elevating material to and discharging it into the top thereof, that is, into the live storage hopper 2. This conveyor may receive material to be elevated from a delivery spout 9 which leads from a hopper 10. As illustrated herein, a conveyor belt 11 and a crusher 12 are interposed between the spout 9 and the hopper 10 so that material discharged into the hopper 10 may be carried through a crusher and delivered into the spout 9 in sizes suitable for the desired purpose. I have shown the hopper 10, belt 11 and crusher 12 enclosed in a chamber formed by walls 13, but it will be understood that any conventional arrangement or location of means for conducting the material to be stored to an elevating means may be adopted without departing from the spirit of my invention.

The live storage hopper 2 is provided with an outlet spout 14 attached to the central part of the bottom wall 3 and is suitably disposed to deliver material from the live storage hopper 2 to any place and at any height desired. For example, as indicated more or less diagrammatically in Fig. 2, the spout 14 is adapted to deliver fuel from hopper 2 to a hopper 15 from whence it may be discharged directly into a furnace 16.

The overflow spouts 4 preferably consist of sheet metal tubes disposed about and close to the periphery of the conical bottom wall 3, and may be secured in holes formed in the wall 3 as by suitable brackets 17 and 18. Additional braces and securing means are shown in rods 19 attached to the spout near its top and secured to the adjacent upright walls 1ᵃ of the bin.

In Fig. 7, I have shown an alternative form of overflow spout 20 which differs from spout 9 only in respect to the adjustability of the spout as regards the depth of material that may be retained in the live storage hopper before the material begins to discharge through the spout. This adjustability is effected by cutting away a part of the front surface of the spout 20 as indicated at 21, fitting over such cut away space an adjustable cover plate 22, and removably securing this plate 22 to the spout 20 by insertion of bolts or rivets 23 in such of the perforations 24 in the spout as may be desired.

The upright walls 1 of the bin may be constructed of metal or other material, but I prefer to construct them of such material as concrete or tile and may employ sectional blocks 1ᵇ. In Fig. 6 is shown two of these blocks, 1ᵇ, illustrative of two horizontal layers of blocks as fitted together in walls 1, and secured together by mortar 1ᶜ. Between the horizontal layers of blocks 1ᵇ, I dispose strengthening means which, in this instance, consists of an annular member 25. This member not only affords lateral support to prevent bulging of the wall or displacement of the blocks, but also affords a convenient and satisfactory means of securing the hopper bottom 3 to the upright wall 1ᵃ... The securing of wall 3 to the walls 1ᵃ may be accomplished in various ways, but as shown here, brackets or hooks 26 secured to the wall 3 at spaced intervals at or adjacent to the periphery of the wall 3, project inwardly between two horizontal layers of blocks 1ᵇ and are then seated beneath and around the member 25. When the blocks 1ᵇ are provided with grooves such as 27, the hooks 26 are additionally positioned and secured to the wall 1 by seating in such grooves.

In operating a storage bin or silo embodying my invention, material is discharged into hopper 10, conducted to conveyor 8 and thence into the live storage hopper 2 from which it may be withdrawn, as desired, through spout 14. In case the hopper becomes full, surplus material overflows through spouts 4 or 20 into the dead storage hopper 5 from whence it can be returned to compartment 2 by permitting it to pass through passage 6 into conveyor 8.

It will be obvious to those skilled in the art that I have provided a strong silo construction but have avoided the expensive unsatisfactory constructions now in use. The upright cylindrical walls may be composed of blocks of tile, concrete or similar material or of poured concrete and the conical metal bottom wall of the live storage hopper may not only be constructed with the desired strength and at low cost but also supported within the cylindrical walls by inexpensive supporting members.

It will also be observed that in my improved construction the weight of the material in the live storage compartment is not concentrated against any one portion of the upright side walls, but on the contrary is carried largely by the conical bottom wall 3 and centrally of the upright walls. When the wall 3 is supported by these upright walls the entire weight of the stored material in the live hopper is equally distributed to the walls without any tendency traceable thereto of bulging of the walls.

Having thus described my invention so that those skilled in the art may be enabled to practice the same, what I desire to secure by Letters Patent is defined in what is claimed, it being understood that the specific details set forth, shown and described above, are given for the purposes of illustration, and not for the purposes of limiting the scope of the invention thereto.

What is claimed is:

1. A storage bin or silo comprising an upright, cylindrical wall, a cross wall disposed within the lower part of the upright wall, and a conically shaped cross wall disposed within the upper part of the upright wall, the said cross walls cooperating with the said upright wall to form dead and live storage hoppers respectively, the said live storage hopper having overflow openings through which material may be discharged into the dead storage hopper.

2. A storage bin or silo comprising an upright, cylindrical wall, a cross wall disposed within the lower part of the upright wall, and a conically shaped cross wall disposed within the upper part of the upright wall, the said cross walls cooperating with the said upright wall to form dead and live storage hoppers respectively, the said live storage hopper bottom having overflow spouts extending therethrough for discharging surplus material into the dead storage hopper.

3. A storage bin or silo comprising an upright, cylindrical wall, a cross wall disposed within the lower part of the upright wall, and a conically shaped cross wall disposed within the upper part of the upright wall and supported therefrom, the said cross walls cooperating with thes aid upright wall to form dead and live storage hoppers respectively, the said live storage hopper bottom having overflow spouts extending therethrough for discharging surplus material into the dead storage hopper.

4. In a storage bin or silo in combination, an upright, cylindrical, sectional wall having interiorly disposed, horizontally arranged reinforcing means, a metallic conical cross wall within the upright wall, and means attached to the said cross wall and cooperating with the reinforcing means for supporting the said cross wall from the upright walls.

5. In a storage bin or silo in combination, an upright, cylindrical, sectional wall, a metallic, conical, cross wall within the upright walls, and means attached to the periphery of the said cross wall and cooperating with the said cross wall for supporting the same from the upright walls.

6. In a storage bin or silo in combination, an upright, cylindrical, sectional wall having interiorly disposed, horizontally arranged, annular reinforcing means, a metallic, conical, cross wall within the upright walls, and means joining the said cross wall to the said upright walls and reinforcing means including a hook secured to the cross wall and anchored between sections of the wall and the reinforcing means.

7. A storage bin or silo comprising an upright, cylindrical wall composed of sections of composition material, and a conically shaped, metallic, cross wall disposed within the upper part of the said upright wall and cooperating therewith to form a live storage hopper, the said cross wall having overflow openings through which surplus material may be discharged from the live storage hopper.

8. A storage bin or silo comprising an upright, cylindrical wall, and a conically shaped, metallic, cross wall disposed within the upper part of the upright wall and cooperating therewith to form a live storage hopper, the said cross wall having overflow spouts through which surplus material may be discharged from the live storage hopper.

9. A storage bin or silo comprising an upright, cylindrical wall, and a conically shaped metallic cross wall disposed within the upper part of the upright wall and cooperating therewith to form a live storage hopper, the said cross wall having adjustable overflow spouts provided with means for adjusting the height thereof to regulate the storage capacity of the live hopper.

10. A storage bin comprising an upright, cylindrical wall, a conically shaped cross wall within the upper portion of said upright wall, and means for suspending the said cross wall from the said upright wall, said conically shaped cross wall having overflow openings disposed adjacent its upper edge.

11. A storage bin comprising an upright, cylindrical wall, a conically shaped cross wall within the upper portion of said upright wall, and means for suspending the said cross wall from the said upright wall, said conically shaped cross wall having overflow openings disposed adjacent its upper edge, the largest diameter of said cross wall being substantially that of the inner diameter of the cylindrical wall.

12. A storage bin comprising an upright, cylindrical wall, a conically shaped cross wall within the upper portion of said upright wall, and means for suspending the said cross wall from the said upright wall, said conically shaped cross wall having overflow openings disposed adjacent its upper edge, the upper edge of the cross wall being of substantially the same diameter as the inner diameter of the cylindrical wall.

13. A storage bin comprising an upright, cylindrical wall composed of composition material, a metallic, conically shaped cross wall within the upper portion of said upright wall, and means for suspending the said cross wall from the said upright wall, said conically shaped cross wall having overflow openings disposed adjacent its upper edge.

14. A storage bin comprising an upright, cylindrical wall, a cross wall within said cylindrical wall forming separate compartments therein, said cross wall forming a hopper within the cylindrical wall, and means to support the cross wall within the cylindrical wall, said cross wall having overflow openings about its periphery and communicating with the compartments.

In testimony whereof I hereunto affix my signature this 31st day of December, 1924.

EARL D. STEARNS.